United States Patent [19]

Sommer

[11] 4,171,038
[45] Oct. 16, 1979

[54] CLUTCH UNIT

[75] Inventor: Gordon M. Sommer, Grosse Pointe Farms, Mich.

[73] Assignee: G. M. Sommer Company, Inc., Warren, Mich.

[21] Appl. No.: 849,857

[22] Filed: Nov. 9, 1977

[51] Int. Cl.² ............... F16D 13/68; F16D 25/063; F16D 13/52
[52] U.S. Cl. ............... 192/70.13; 192/70.14; 192/70.2; 192/85 AA; 192/107 R; 192/113 B
[58] Field of Search ............... 192/70.12, 70.13, 70.2, 192/85 AA, 107 R, 113 B, 70.14; 188/73.2, 73.6, 18 A, 218 XL

[56] References Cited

U.S. PATENT DOCUMENTS

| | | | |
|---|---|---|---|
| 1,731,064 | 10/1929 | Spase | 192/70.2 X |
| 2,893,519 | 7/1959 | Martin | 188/218 XL |
| 3,237,731 | 3/1966 | Du Bois | 188/218 XL |
| 3,412,836 | 11/1968 | Wilmer | 192/107 R |
| 3,680,666 | 8/1972 | Sommer | 192/70.2 X |
| 3,696,898 | 10/1971 | Sommer | 192/18 A |
| 3,713,517 | 1/1973 | Sommer | 192/18 A |
| 3,722,645 | 3/1973 | Sommer | 192/70.13 |

FOREIGN PATENT DOCUMENTS 1153950 11/1959 Fed. Rep. of Germany ...... 192/107 R

Primary Examiner—Allan D. Herrmann
Attorney, Agent, or Firm—Harness, Dickey & Pierce

[57] ABSTRACT

A clutch unit for selectively drivingly connecting driving and driven shafts, the unit comprising, a first plurality of discs connected with one of the shafts and a second plurality of discs connected with the other of the shafts, the first and second plurality of discs being interleaved and being movable toward and away from one another to drivingly connect the driving and driven shafts, selective of the discs being fabricated of circumferentially arranged disc segments whereby the diameter of the discs (and hence the capacity of the clutch unit), may be increased significantly as compared to existing and prior known clutch units of the same general type.

20 Claims, 4 Drawing Figures

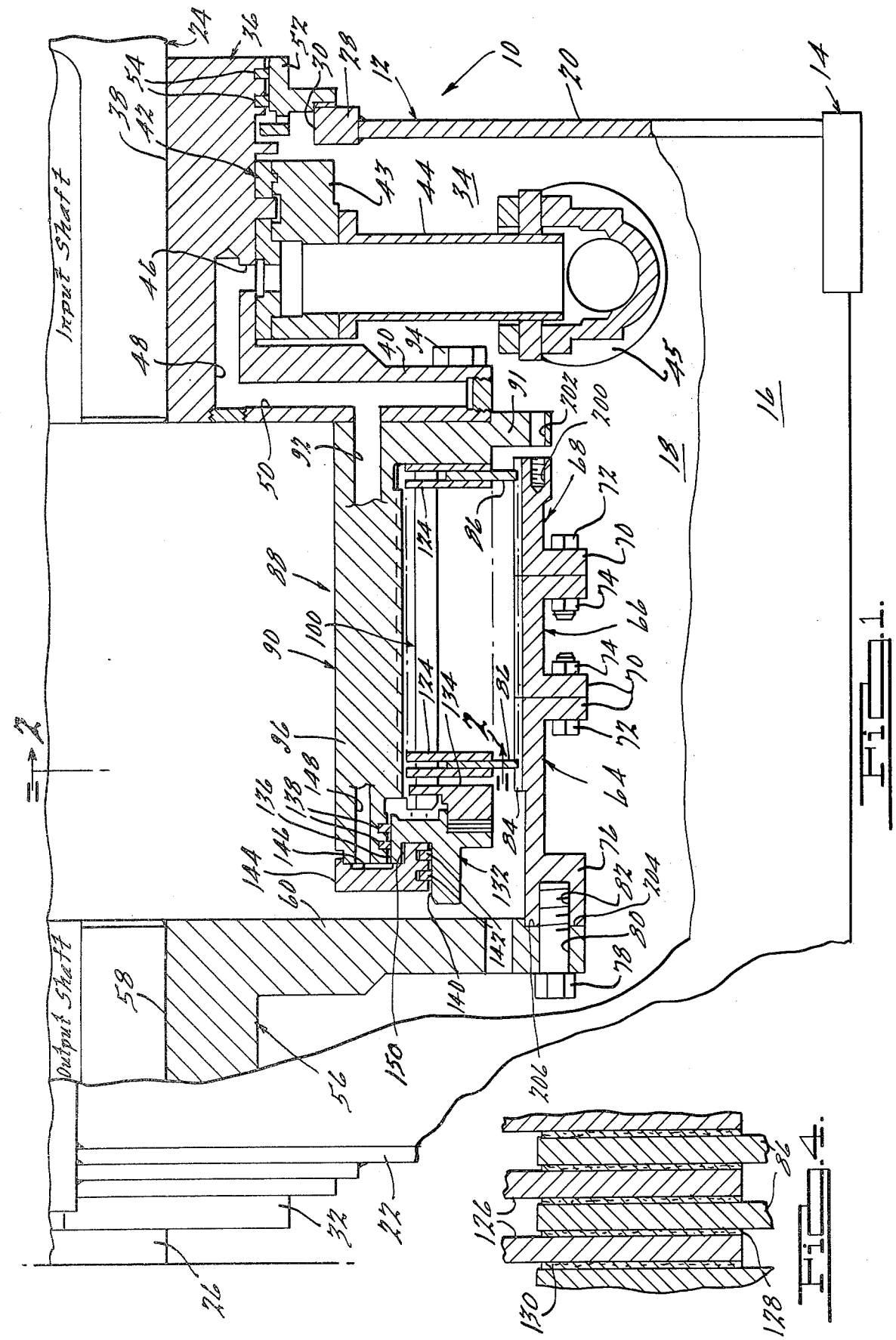

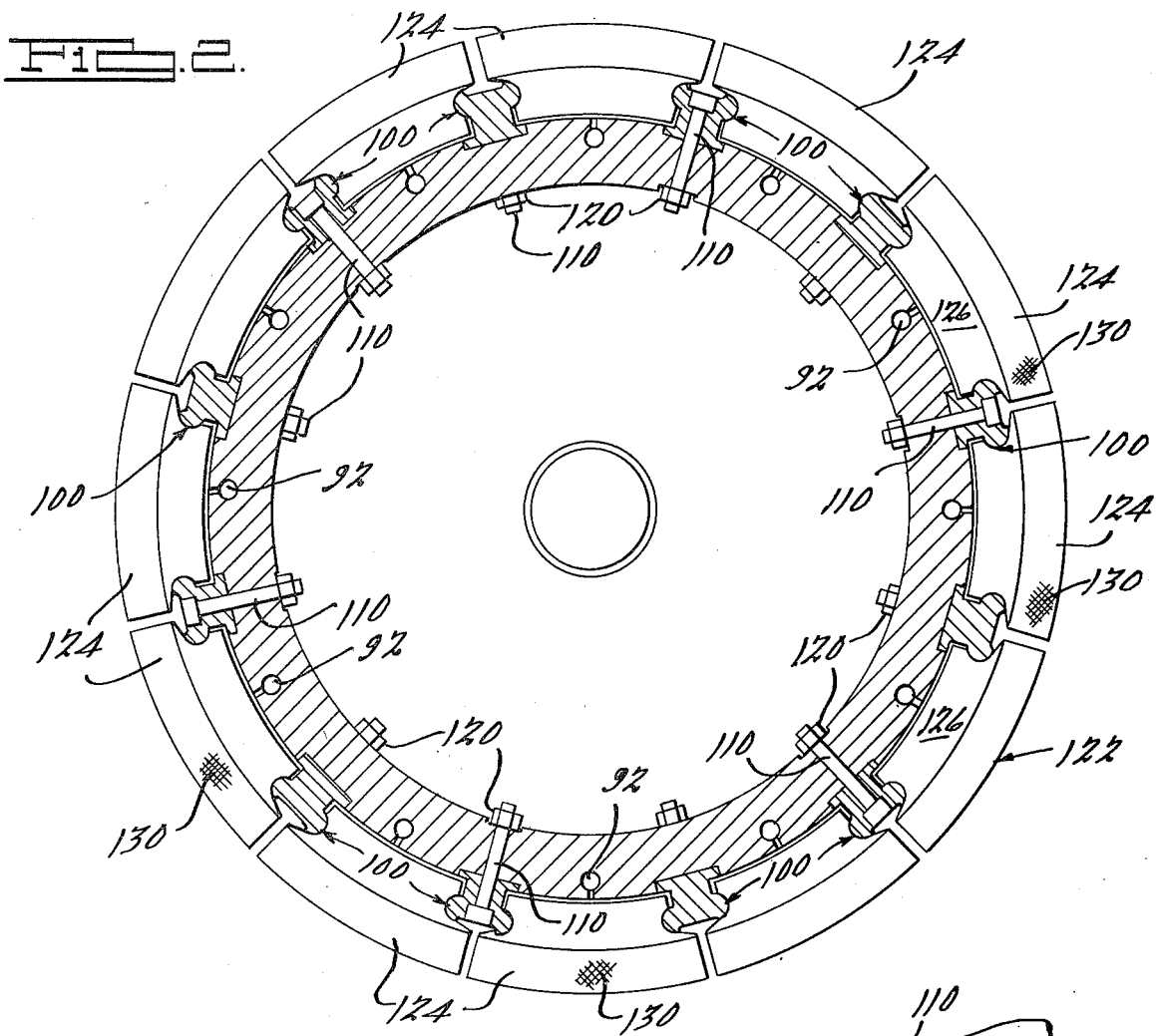
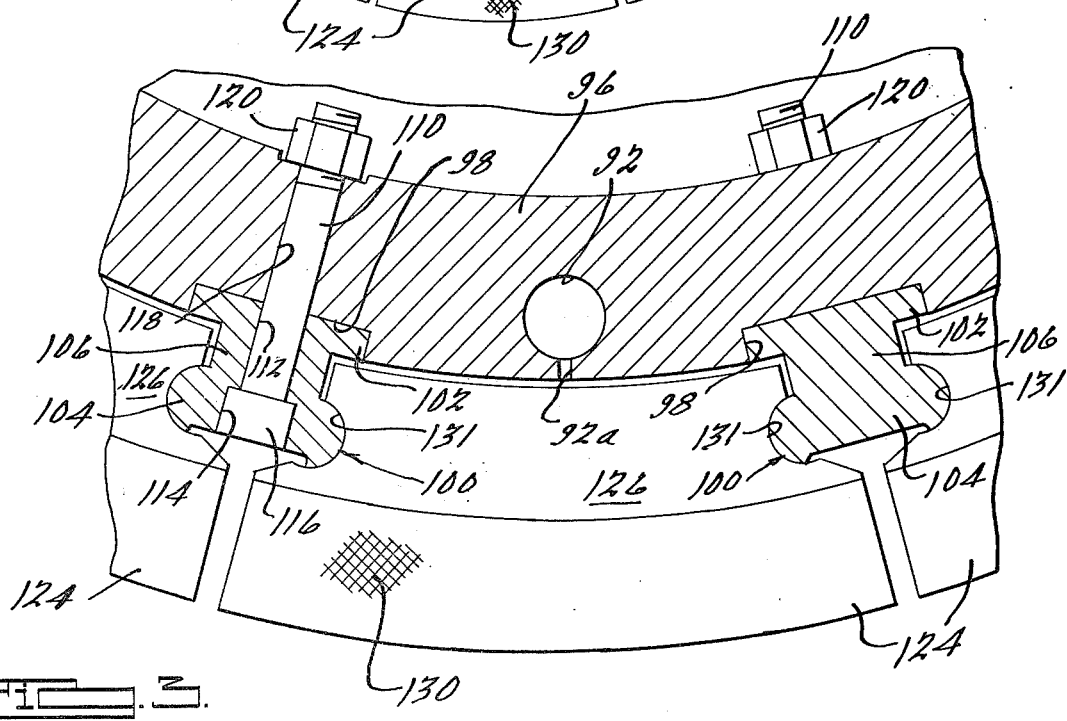

4,171,038

CLUTCH UNIT

BACKGROUND AND SUMMARY OF THE INVENTION

The present invention relates generally to a new and improved clutch unit of the type generally shown and described in U.S. Pat. No. 3,722,645. More particularly, the present invention is directed toward a relatively large capacity clutch unit of the aforementioned type in which selective of the clutch discs comprise circumferentially arranged disc segments which enable the size of the clutch disc assemblies to be significantly larger than similar prior art designs and hence permits the design of considerably larger clutch units (in the order of ten thousand (10,000) horsepower) than has been heretofore possible.

It is accordingly a general object of the present invention to provide a new and improved clutch unit of the above character.

It is a more particular object of the present invention to provide a new and improved clutch unit that is capable of transmitting large magnitudes of torque.

It is another object of the present invention to provide a new and improved clutch unit which obviates the need for cutting relief slots in the clutch discs pursuant to prior art teachings without any sacrifice in the heat dissipating characteristics of the unit.

It is still another object of the present invention to provide a new and improved clutch unit wherein the diameter of the clutch discs may be upwards of and exceed approximately seven feet in diameter.

It is another object of the present invention to provide a new and improved clutch unit of the above-described type wherein the disc segments of selective clutch discs are individually driven by associated keyway members and are not mounted on a common disc-shaped support member, as has been the case with the closest known prior art designs.

It is a further object of the present invention to provide a new and improved clutch unit which may be conveniently installed without requiring machining of the associated driving or driven shafts, and wherein installation and servicing may be accomplished without disturbing the existing associated machinery.

Other objects and advantages of the present invention will become apparent from the following detailed description taken in conjunction with the accompanying drawings.

BRIEF DESCRIPTION OF THE DRAWINGS

FIG. 1 is an enlarged fragmentary cross-sectional view, partially broken away, of a clutch unit of the present invention and in particular, illustrates the portion of the clutch unit below the center line of the rotational axis of the clutch unit;

FIG. 2 is a transverse cross-sectional view taken substantially along the line 2—2 of FIG. 1;

FIG. 3 is an enlarged fragmentary view of a portion of the structure shown in FIG. 4; and FIG. 4 is an enlarged cross-sectional view of the clutch plates and discs shown in FIG. 1.

DESCRIPTION OF A PREFERRED EMBODIMENT

Referring now in detail to the drawings and in particular to FIG. 1 thereof, a clutch unit 10, in accordance with one preferred embodiment of the present invention, is shown as being housed within an exterior enclosure 12 having a base structure 14 adapted to be operatively supported upon a suitable support surface. The housing 12 includes laterally spaced side sections 16 and 18 and axially or longitudinally spaced end sections 20 and 22 that extend laterally between the side sections 16, 18. The clutch unit 10 is shown in operative association with a driving shaft 24 of a suitable source of motive power, i.e., electric motor, etc. (not shown), and with a driven shaft, generally designated by the numeral 26, of an associated work performing apparatus. Generally speaking, the clutch unit 10 is supported upon the driving and driven shafts 24, 26 in essentially the same manner as the clutch unit disclosed in U.S. Pat. No. 3,722,645. As will hereinafter be described in detail, upon energization of the clutch unit 10, the driving shaft 24 will be drivingly connected to the driven shaft 26, whereby rotary power is transferred from the source of motive power to the work performing apparatus. Similarly, at such time as the clutch unit 10 is de-energized, the driving and driven shafts 24 and 26 are drivingly disconnected, whereby the associated work performing apparatus ceases to be driven by the source of motive power. It is to be noted that the clutch unit 10 of the present invention may be operated in a constant speed mode of operation, wherein the driving and driven shafts are rotated concurrently upon energization of the clutch, and also, the clutch unit 10 may be operated in a variable speed mode, wherein the driving shaft is driven at some speed greater than the driven shaft 26, depending upon the degree of actuation of the clutch unit 10.

The end section 20 of the housing 12 is provided with an enlarged thickness annular section 28 which defines a generally circular opening 30 through which the driving shaft 24 extends. In a similar manner, the end section 22 of the housing 12 is provided with an annular section 32 which defines an opening (not shown) through which the driven shaft 26 extends. The aforesaid annular openings are communicable with an internal clutch chamber, generally designated by the numeral 34, within which the clutch actuating mechanism for drivingly connecting the driving shaft 24 with the driven shaft 26 is located, as will hereinafter be described in detail.

As shown in FIG. 1, the driving shaft 24 is provided with an annular driving hub, generally designated by the numeral 36, which defines a central, axially extending bore 38 within which the inner end of the driving shaft 24 is received. The hub 36 and shaft 24 are drivingly connected with one another, by any suitable keyway means or the like, whereby upon rotation of the driving shaft 24, the hub 36 will rotate concomitantly therewith. The driving hub 36 includes a radially outwardly extending inner end section, generally designated by the numeral 40, and carries or supports an oil seal ring assembly 42 having a radially outwardly disposed section 43 which is communicable via a suitable oil supply conduit 44 with an oil manifold 45. The conduit 44 is communicable with a radial bore 46 in the driving hub 36 which in turn is communicable with an axially extending bore 48 and one or more radially outwardly extending fluid passages 50 formed in the radially outwardly extending section 40 of the hub 36. The manifold 45 is connected to a suitable source of cooling fluid (oil) which may be located either externally or internally of the housing 12 and which is supplied to the passages 46, 48 and 50 by means of a suitable pumping arrangement which, in one contemplated embodiment of the present invention, has a capacity in the order of approximately 850 gallons per minute. Such a typical embodiment of the clutch unit of the present invention is contemplated as having a capacity of approximately 10,000 horsepower, a speed of between 105–150 r.p.m. and a clutch diameter of between 54–60 inches.

Disposed directly adjacent the annular section 28 is an annular grease seal ring 52 which is cooperable with taconite, for example, sealing elements 54 for providing the desired peripheral seal around the outer periphery of the hub 36. An analogous sealing arrangement is provided around the outer periphery of a driven hub 56 that is similar in construction to the driving hub 36 and is carried upon the driven shaft 26 by having said shaft received within a central axially extending bore 58, whereupon rotation of the hub 56 will result in concomitant rotation of the shaft 26. The hub 56 includes a radially outwardly extending section 60 which cooperates with the section 40 of the driving hub 36 in supporting the clutching mechanism of the present invention, in a manner hereinafter to be described.

As shown in FIG. 1, disposed between the radially outwardly extending sections 40 and 60 of the driving and driven hubs 36 and 56 is a plurality of annular clutch plate carrying rings, generally designated by the numerals 64, 66 and 68. The rings 64–68 are arranged concentrically of the axis of the input and output shafts 24 and 26 and are arranged in axially abutting relationship, as shown. The rings 64–68 are provided with radially outwardly extending flanges 70 at their axially abutting edges, which flanges 70 are secured together by a plurality of circumferentially spaced, axially extending suitable screws, bolts or the like 72 and nuts 74 to provide an annular unitized structure. The ring 64 is also provided with a radially outwardly extending flange or shoulder 76 which is adapted to be connected by a plurality of circumferentially spaced screws, bolts or the like 78 to the radially outwardly extending section 60 of the driven hub 56, the bolts 78 extending through suitable axially extending bores 80 in the section 60 and being threadably engaged within suitable threaded blind bores 82 in the flange 76. It should be noted that the axial length of the unitized assembly consisting of the plate carrying rings 64, 66, 68 may be varied by adding or removing additional rings, such as the intermediate ring 66, whereby to vary the capacity of the clutch unit 10 of the present invention, as will be apparent to those skilled in the art.

The inner periphery of the assembly consisting of the plate carrying rings 65, 66 and 68 defines an annular surface which is formed with a plurality of circumferentially spaced, axially extending and radially inwardly projecting ribs or splines, generally designated by the numeral 84. The splines 84 are adapted to carry a plurality of radially inwardly extending clutch plates 86, each of which is formed with a plurality of recesses or notches around the outer periphery thereof adapted for keyed engagement with the plurality of splines 84, whereby the plates 86 are adapted to rotate concomitantly with the support rings 64, 66 and 68 and be axially or longitudinally slidable along the splines 84, for purposes hereinafter to be described.

Disposed radially inwardly from the plurality of clutch plates 86 is a clutch disc assembly, generally designated by numeral 88. The assembly 88 comprises a clutch disc support member or clutch hub 90 that is arranged coaxially of the shafts 24, 26 and includes a radially outwardly extending section 91 disposed adjacent the section 40 of the support collar 36 and secured thereto in a manner hereinafter to be described. The clutch hub 90 is formed with a plurality of axially extending, circumferentially spaced bores or fluid passages, generally designated by the numeral 92, which, as seen in FIG. 3, are communicable via discharge ports 92a with the radially outermost portion of the clutch hub 90. The passages 92 are adapted to be communicable with the aforedescribed radial bores 50, whereby cooling fluid may be communicated from the aforementioned source thereof to the plurality of clutch discs and plates constituting the clutch actuating mechanism of the unit 10. The clutch hub 90 is operatively secured to the section 40 of the driving hub 36 by means of a plurality of axially extending, circumferentially spaced screws, bolts or the like, representatively designated by the numeral 94, in FIG. 1, whereby the clutch hub 90 will rotate concomitantly with the driving hub 36 and driving shaft 24 relative to the driven hub and shaft 56, 26, respectively when the clutch unit 10 of the present invention is deactuated.

As best shown in FIG. 2, the clutch hub 90 comprises a generally annular body 96 which is arranged coaxially of the axis of the unit 10 and is formed with a plurality of outer peripheral axially extending, circumferentially spaced grooves or recesses, generally designated by the numeral 98 (see FIG. 3 for an enlarged depiction of the recesses 98). Associated with each of the recesses 98 is a longitudinally or axially extending keyway member, generally designated by the numeral 100, which includes a base portion 102, an enlarged head portion 104 and a reduced thickness intermediate portion 106. As best seen in FIG. 3, the head portion 104 of each of the keyways 100 is formed with opposed, generally arcuate concave surfaces 108, and the keyways 100 are adapted to be secured to the outer periphery of the support member body 96 by suitable radially inwardly extending screws, bolts or the like, generally designated 110. In particular, each of the keyways 100 has the base portion 102 thereof nestingly received within the associated of the recesses 98, the bolts 110 extending radially inwardly through bores 112 formed in the keyways 100, the radially outer ends of the bores 112 being formed with enlarged diameter counter-bores within which the bolt heads 116 are received. The clutch hub 90 is formed with a plurality of axially spaced radially extending bores 118 through which the radially inner ends of the bolts 110 extend, with suitable nuts 120 being secured to the radially inner ends of the bolts 110, whereby to fixedly secure the plurality of keyways 100 upon the clutch hub 90.

In accordance with the principles of the present invention, the plurality of keyways 100 are adapted to carry a series of clutch discs, generally designated by the numeral 122, which are interleaved between the plurality of clutch plates 86 carried upon the splines 84. As best seen in FIG. 2, each of the clutch discs 122 comprises a plurality of circumferentially extending disc segments, generally designated by the numeral 124, with each of the segments 124 extending circumferentially between and being supported by pairs of adjacent axially extending keyways 100. Each of the disc segments 124 comprises a plate-like body member 126 having opposed surfaces 128 and 130 (see FIG. 4) which are adapted for cooperation with the adjacent clutch plates to provide the clutching action achieved by the unit 10 of the present invention.

In one preferred construction of the present invention, the plurality of disc segments 124 are fabricated with a steel core upon which bronze facings have been sintered. The faces are preferably, although not necessarily, formed with suitable grooves which produce lands that are in the shape of small parallelograms which act similar to minute hydro-dynamic bearings in the presence of controlled oil flow and function to maintain a thin, but positive oil film between the confronting faces of the disc segments 124 and associated plates 86, and it is the shearing of this oil film which transmits torque between the plates 86 and discs 122, and hence between the driving shaft 24 and driven shaft 26 during operation of the clutch unit 10. The circumferentially opposite ends of each of the segments 124 are formed with inwardly projecting, generally semicircular recesses 131 which are adapted for reception of the arcuate-shaped portions of the adjacent keyways 100, whereby to drivingly connect the disc segments 124 with the clutch hub 90, yet permit the segments 124 to be moved axially relative of the clutch hub 90, for purposes hereinafter to be described.

In order to effect actuation of the clutch unit 10, an annular piston member 132 is provided adjacent the end of the clutch hub 90 opposite the end section 91 thereof. The piston member 132 is provided with an actuating surface, generally designated by the numeral 134, which is adapted to move axially of the hub 90 upon actuation of the unit 10 in order to effect clutching action of the clutch discs and plates. The piston member 132 also includes a generally axially extending annular surface 136 which is engageable by a suitable fluid sealing means 138 carried on the hub 90, with a similar axially extending annular surface 140 cooperating with sealing means 142 to define a piston chamber, hereinafter to be described. The piston member 132 is retained upon the hub 90 by means of an annular retaining ring 144 which defines an annular recess 146 that is communicable with a fluid passage 148 and with the aforementioned piston chamber which is representatively designated by the numeral 150. The passage 148 is communicable with a suitable source of pressurized actuating fluid, which is communicable via suitable fluid passage means in the driven hub 36, and when the pressure of such fluid is increased to a predetermined magnitude, the piston member 132 will move axially toward the right in FIG. 1, thereby causing the clutch discs and plates to move into clutching relationship to effect a driving connection between the driving shaft 24 and the driven shaft 26. It is to be noted that de-actuation of the unit 10 may be achieved by properly and selectively pressurizing the righthand end of the piston chamber 150 (through suitable fluid passages connecting to a source of pressurized fluid) or alternatively, appropriate retraction springs (not shown) or other suitable piston retracting means may be used, as will be appreciated by those skilled in the art.

One particularly important feature of the present invention, and which is also incorporated in the aforementioned U.S. Pat. No. 3,722,645, resides in the simplicity with which the clutch unit 10 may be serviced without disturbing the associated machinery, i.e., source of motive power and work performing apparatus. In particular, access to the plurality of clutch discs and plates is accomplished through the provision of a plurality of axially extending internally threaded bores 200 formed in the end of the ring 68 and which are circumferentially and axially aligned with a cooperable series of bores 202 formed around the periphery of the section 91 of the clutch hub 90. It will be seen that in the normal operating configuration of the clutch unit 10, the axially outer end 204 of the ring 64 is nestingly received within an annular recess or shoulder 206 on the radially outwardly extending section 60 of the driven hub 56. At such time as it is desired to provide access to the clutch discs and plates, the plurality of bolts 78 are removed and a plurality of screws, bolts or the like (not shown) are inserted through the bores 202 and threaded into the bores 200. As such bolts are threadably advanced, the entire assemblage consisting of the rings 64, 66, 68 is axially drawn or biased to the right in FIG. 1 so that the end 204 of the ring 64 is moved off of the shoulder 206. After the plurality of rings 64, 66, 68 are properly supported, i.e., by means of a suitable sling or the like, the plurality of bolts 94 may be removed, at which time the entire clutch assembly, including the clutch hub 90, clutch discs and plates and rings 64, 66 and 68 may be removed from between the driving hub 36 and driven hub 56, for purposes of repair, replacement, inspection, etc. Replacement or reinsertion of the entire aforesaid assemblage may be conveniently accomplished by merely reversing this operation.

One of the primary features of the present invention is derived from the fact that a clutch unit of a relatively high capacity can be provided without requiring extraordinary production facilities. In particular, by virtue of the fact that the clutch segments 124 may be manufactured with existing equipment and then be assembled into relatively large diameter clutch discs, the same equipment can be used for producing large capacity clutches, such as in the present invention, as has heretofore been used for clutches of much smaller size. Accordingly, manufacturing costs for the clutch unit 10 of the present invention can be maintained at a reasonable level. An additional feature of the present invention resides in the fact that since the clutch segments 124, when assembled into their respective clutch discs, are separated from one another via the keyways 100, it is not necessary to form the traditional heat relief grooves in the discs which have been necessary in order to compensate for heat expansion in prior art devices. Of course, various other features and advantages of the present invention will become readily apparent to those skilled in the art.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A clutch unit comprising,
   a driving shaft-like member,
   a driven shaft-like member,
   first and second pluralities of radially disposed alternatively axially arranged clutch discs,
   means securing said first plurality of discs for rotation with one of said members and said second plurality of discs for rotation with the other of said members,
   pressure operated means operable to cause said first and second pluralities of discs to provide driving connection between said members, and selective of said discs comprising a plurality of circumferentially arranged individual disc segments, said first plurality of discs being secured to said driven shaft-like member and said second plurality of discs comprising said disc segments and being drivingly connected to said driving shaft-like member by a plurality of circumferentially spaced axially extending keyway members, said disc segments extending circumferentially between circumferentially adjacent keyway members and being slidable axially of said keyway members, said keyway members comprising circumferentially extending arcuate-shaped shoulder portions adapted for engagement within complementary-shaped portions formed in the circumferentially opposite ends of said disc segments.

2. A clutch unit as set forth in claim 1 wherein said pressure operated means comprises a piston operable to bias said discs toward a position drivingly connecting said driving member with said driven member.

3. A clutch unit as set forth in claim 1 wherein said keyway members are fixedly connected to the outer periphery of a generally cylindrically-shaped hub member having oil flow passages formed therein through which cooling oil may be supplied to said discs.

4. A clutch unit as set forth in claim 3 which includes pressure operated piston member carried on said cylindrical hub member for effecting actuation of said discs.

5. A clutch unit as set forth in claim 4 wherein said hub member is removable from between said shaft-like members.

6. A clutch unit as set forth in claim 1 which includes a plurality of axially adjacent circumferentially extending rings secured together in a unitized assembly and defining a plurality of axially extending splines for drivingly connecting said first plurality of discs to one of said shaft-like members.

7. A clutch unit as set forth in claim 6 wherein said first plurality of discs are longitudinally slidable along said spline.

8. A clutch unit as set forth in claim 1 wherein said disc segments are longitudinally slidably guided by said arcuate shoulder portions.

9. The invention as set forth in claim 1 which includes a clutch hub having a plurality of circumferentially spaced, axially extending recesses formed therein.

10. The invention as set forth in claim 9 which includes a longitudinally extending keyway disposed in part within each of said recesses.

11. The invention as set forth in claim 10 which includes radially extending fastening means for securing said keyways within said recesses.

12. The invention as set forth in claim 10 which includes a plurality of longitudinally extending cooling fluid passages formed in said hub.

13. The invention as set forth in claim 12 which includes fluid port means communicating said passages with said discs.

14. A disc assembly for use in a clutch-type drive unit, said assembly comprising a plurality of circumferentially spaced, axially extending keyway elements, means supporting said elements for rotating about a centrally located axis of rotation, a plurality of arcuate-shaped disc segments, arranged circumferentially in end-to-end relationship around said axis, said keyway elements comprising arcuate-shaped shoulder portions adapted for nesting engagement with complementary-shaped recesses formed in the opposite ends of said disc segments.

15. The invention as set forth in claim 14 wherein said disc segments are slidable longitudinally of said keyway elements.

16. The invention as set forth in claim 14 wherein said clutch unit is of the type adapted to be associated with driving and driven shafts, which includes a first plurality of discs secured for rotation with one of the shafts and a second plurality of discs secured for rotation with the other of the shafts, and which includes pressure operated means for causing said first and second plurality of discs to provide driving connection between said shafts.

17. The invention as set forth in claim 14 wherein said disc segments have clutch disc cooperating faces on the opposite sides thereof.

18. The invention as set forth in claim 16 wherein said pressure operated means comprises fluid responsive piston means.

19. The invention as set forth in claim 16 wherein said clutch is of the oil-shear type.

20. The invention as set forth in claim 16 which includes means for removing said clutch discs in a generally unitized assembly.

* * * * *